(12) United States Patent
Kim et al.

(10) Patent No.: US 8,738,055 B2
(45) Date of Patent: May 27, 2014

(54) APPARATUS AND METHOD FOR MANAGING NEIGHBOR BS LIST IN DISTRIBUTED WIRELESS AD HOC NETWORK

(75) Inventors: Bong-Chan Kim, Suwon-si (KR); Seong-Wan Kim, Seoul (KR); Jeong-Dae Kim, Hwaseong-si (KR); Hee-Kwun Cho, Incheon (KR); Kwang-Sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 13/031,057

(22) Filed: Feb. 18, 2011

(65) Prior Publication Data

US 2011/0201369 A1  Aug. 18, 2011

(30) Foreign Application Priority Data

Feb. 18, 2010  (KR) .................. 10-2010-0014477

(51) Int. Cl.
*H04B 7/00* (2006.01)

(52) U.S. Cl.
USPC ........... 455/507; 455/443; 455/436; 455/515; 370/238

(58) Field of Classification Search
USPC .................. 455/442–446, 456.2, 7, 437, 436, 455/435.1, 423, 432.1, 515; 370/338, 331, 370/329, 254–258, 238
See application file for complete search history.

(56) References Cited

U.S. PATENT DOCUMENTS

| | | | | |
|---|---|---|---|---|
| 5,982,758 | A * | 11/1999 | Hamdy | 370/331 |
| 7,050,803 | B2 * | 5/2006 | Celedon et al. | 455/436 |
| 7,184,421 | B1 * | 2/2007 | Liu et al. | 370/338 |
| 7,792,059 | B2 * | 9/2010 | Fonseca et al. | 370/255 |
| 2002/0145978 | A1 * | 10/2002 | Batsell et al. | 370/238 |
| 2005/0250499 | A1 * | 11/2005 | Lee et al. | 455/437 |
| 2006/0089964 | A1 * | 4/2006 | Pandey et al. | 709/203 |
| 2007/0258393 | A1 * | 11/2007 | Cam-Winget et al. | 370/310 |
| 2008/0013502 | A1 * | 1/2008 | Clark | 370/338 |
| 2008/0096581 | A1 * | 4/2008 | Do et al. | 455/456.2 |
| 2008/0165831 | A1 * | 7/2008 | Chu et al. | 375/132 |
| 2009/0005052 | A1 * | 1/2009 | Abusch-Magder et al. | 455/446 |
| 2009/0059867 | A1 * | 3/2009 | Rajasimman et al. | 370/332 |
| 2011/0202651 | A1 * | 8/2011 | Hilt et al. | 709/224 |
| 2013/0079005 | A1 * | 3/2013 | Watanabe | 455/435.1 |

* cited by examiner

*Primary Examiner* — Sujatha Sharma

(57) ABSTRACT

An apparatus and a method manage a neighbor base station list (NBL) in a distributed wireless ad-hoc network. Information of neighbor BSs is collected at the BS using a surrounding environment detection function. Neighbor BSs that satisfy a certain condition are determined, among the neighbor BSs from which the information is collected. And the NBL is generated based on the determined neighbor BSs.

22 Claims, 16 Drawing Sheets

1) DISTANCE THRESHOLD BETWEEN SECTOR ANTENNA BS OF MER AND SECTOR ANTENNA BS OF MER

2) DISTANCE THRESHOLD BETWEEN SECTOR ANTENNA BS OF MER AND OMNI-ANTENNA BS OF MR

3) DISTANCE THRESHOLD BETWEEN OMNI-ANTENNA BS OF MR AND SECTOR ANTENNA BS OF MER

4) DISTANCE THRESHOLD BETWEEN OMNI-ANTENNA BS OF MR AND OMNI-ANTENNA BS OF MR

APPARATUS AND METHOD FOR MANAGING NEIGHBOR BS LIST IN DISTRIBUTED WIRELESS AD HOC NETWORK

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 18, 2010 and assigned Serial No. 10-2010-0014477, the entire disclosure of which is hereby incorporated by reference.

TECHNICAL FIELD OF THE INVENTION

The present invention relates generally to a distributed wireless ad-hoc network. In particular, the present invention relates to an apparatus and a method for managing a neighbor base station list.

BACKGROUND OF THE INVENTION

In recent, application of Institute of Electrical and Electronics Engineers (IEEE) 802.16 technology to public safety networks such as disaster network and police network is under discussion. The disaster network or the police network is of a distributed wireless ad-hoc network type to handle dangerous situations which may happen anywhere and at anytime.

FIG. 1 depicts distributed wireless ad-hoc network configuration.

The distributed wireless ad-hoc network of FIG. 1 includes a plurality of Mesh Routers (MeRs) 100, 102, 104, and 106, and a plurality of Mobile Routers (MRs) 110, 112, and 114. The MeRs 100, 102, 104, and 106, which are stationary, build a mesh backbone network by forming a wireless backbone link to other MeRs or MRs through a wireless backbone interface. The MeRs 100 through 106 function as a base station for access of a mobile station. The MRs 110, 112, and 114 are installed and transferred to service a plurality of mobile stations grouped to execute tasks. The MRs 110 through 114 maintain connection to the wireless backbone network by building a wireless backbone link to the MeR through the wireless backbone interface, and function as a base station for the access of the mobile station. Herein, the MeRs 100 through 106 support a sector antenna base station, and the MRs 110 through 114 support an omni-antenna base station.

To ensure free movement of the mobile station over the distributed wireless ad-hoc network, it is necessary for the base station of the MeR or the MR to automatically generate a neighbor base station list.

Typically, a cellular system manages the neighbor base station list in a centralized manner. In the cellular system, a central controller collects information of every base station in the coverage and provides optimum neighbor base station information per base station. This centralized manner is fit for a system environment that includes the robust wire-base backbone network and guarantees stability of the central controller.

Disadvantageously, the neighbor base station list management in the centralized manner is not suitable to the distributed wireless ad-hoc network that makes up the wireless backbone network.

SUMMARY OF THE INVENTION

To address the above-discussed deficiencies of the prior art, it is a primary aspect of the present invention to provide an apparatus and a method for managing a neighbor base station list in a distributed wireless ad-hoc network.

Another aspect of the present invention is to provide an apparatus and a method of a base station for generating and managing a neighbor base station list by collecting information of neighbor base stations using a surrounding environment detection function in a distributed wireless ad-hoc network.

Yet another aspect of the present invention is to provide an apparatus and a method for generating and managing a neighbor base station list by sending and receiving messages between base stations in a distributed wireless ad-hoc network.

According to one aspect of the present invention, a method of a Base Station (BS) for managing a neighbor BS list (NBL) in a distributed wireless ad-hoc network includes collecting, at the BS, information of neighbor BSs using a surrounding environment detection function. Neighbor BSs which satisfy a certain condition are determined among the neighbor BSs from which the information is collected. And the NBL is generated based on the determined neighbor BSs.

According to another aspect of the present invention, an apparatus of a BS for managing a neighbor BS list (NBL) in a distributed wireless ad-hoc network includes a communication module for communicating with neighbor BSs over a wireless backbone link. And a controller collects information of neighbor BSs using a surrounding environment detection function, determines neighbor BSs that satisfy a certain condition among the neighbor BSs from which the information is collected, and generates the NBL based on the determined neighbor BSs.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless ad-hoc network.

Embodiments of the present invention provide a technique of a Base Station (BS) for collecting information of neighbor BSs by using a surrounding environment detection function and generating and managing a neighbor BS list by sending and receiving messages to and from neighbor BSs in a distributed wireless ad-hoc network. The present technique of the BS includes generating the neighbor BS list during an initialization process and updating the neighbor BS list according to a change of a surrounding environment when the BS is operated.

Hereinafter, it is assumed that BSs of a Mesh Router (MeR) and a Mobile Router (MR) that make up the distributed wireless ad-hoc network may detect frequency information (Frequency Assignment (FA)) and preamble information (Preamble Index (PI)) of neighbor base stations using a surrounding environment detection function (Over The Air Receiver (OTAR)), and obtain their location information using Global Positioning System (GPS). When the location information obtained by the BS is incorrect or the GPS is unavailable, it is assumed that the BS may obtain the location information through user input. Herein, the BS may be mobile.

Hereinafter, a candidate Neighbor BS List (NBL) and an NBL are generated and managed. The candidate NBL is an aggregation of neighbor BSs discovered by the BS using the surrounding environment detection function or using message transmission and reception. The BS may support handoff (or handover) of the Mobile Station (MS) belonging to the BS of the candidate NBL. The NBL is an aggregation of neighbor BSs contained in a notification message broadcast by the BS to MSs and indicates a BS to which the MS can hand over.

The BS may be a BS of the MeR or a BS of the MR. Operations of the BS for generating and managing the NBL may be fulfilled by the MeR and the MR.

Figure 1:
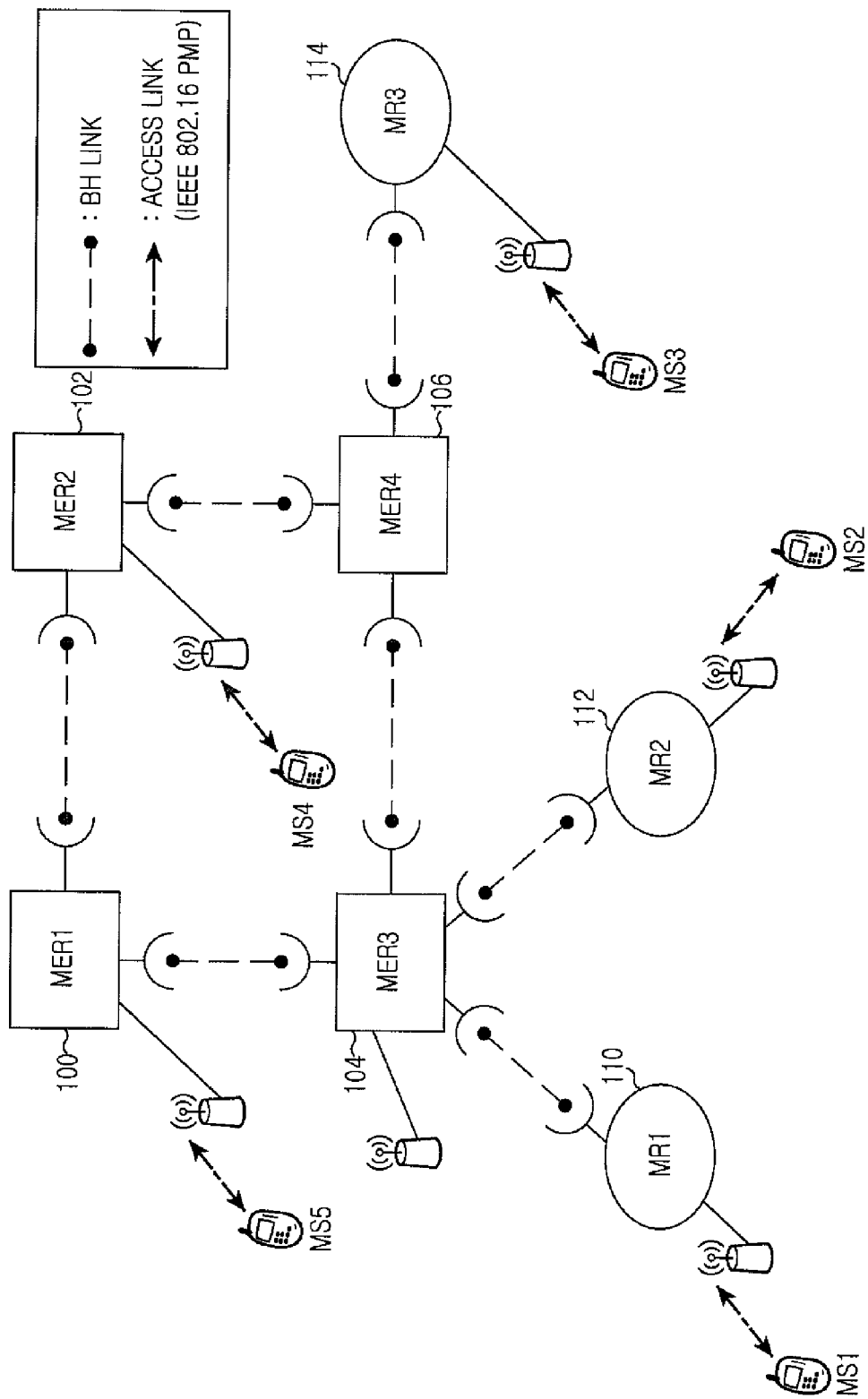
FIG. 1 illustrates distributed wireless ad-hoc network configuration.
Figure 2:
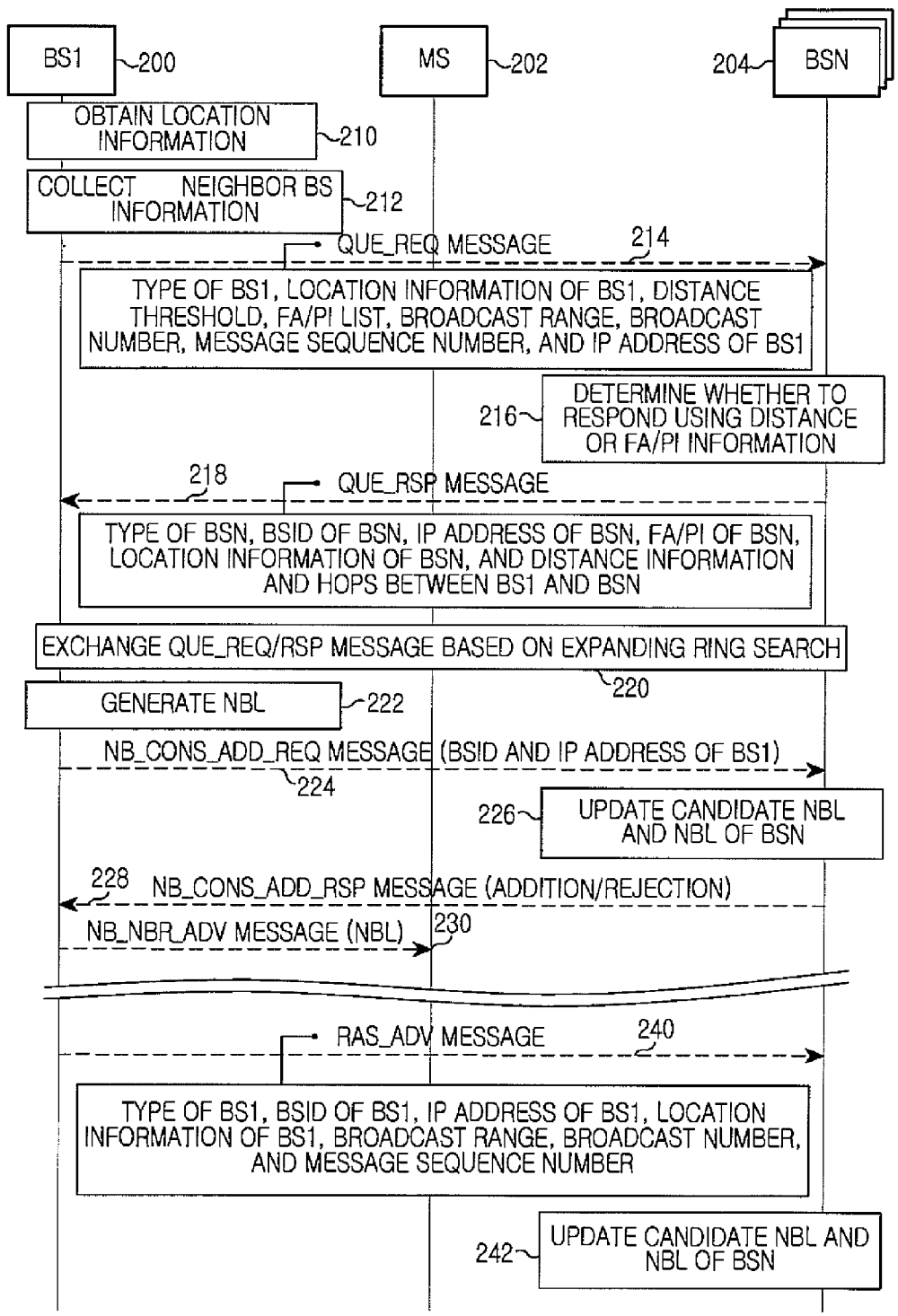
FIG. 2 illustrates signaling between base stations to generate and manage a neighbor base station list in a distributed wireless ad-hoc network according to an embodiment of the present invention.

FIG. 2 illustrates signaling between BSs to generate and manage the NBL in a distributed wireless ad-hoc network according to an embodiment of the present invention.

A BS1 200 obtains its location information (e.g., (x, y) coordinates) by using the GPS in step 210. In step 212, the BS1 200 obtains and stores frequency allocation (FA) information and preamble information (PI) of each neighbor BS, and Received Signal Strength Indicator (RSSI) and/or Carrier to Interference-and-Noise Ratio (CINR) per FA/PI using the surrounding environment detection function. Based on the information obtained using the surrounding environment detection function, the BS1 200 may determine its FA, PI, and transmit power.

Figure 9:
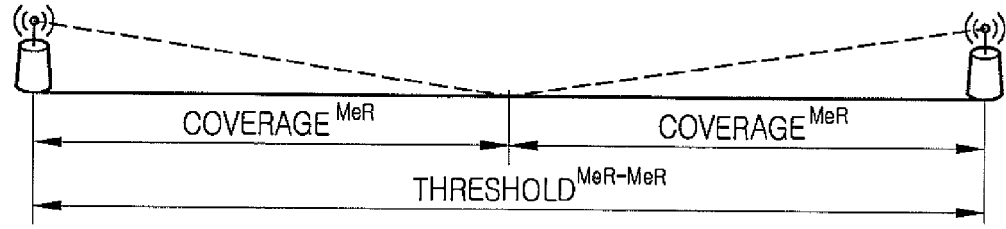
FIG. 9 illustrates distance thresholds per base station type in the distributed wireless ad-hoc network according to an embodiment of the present invention.
Figure 9:
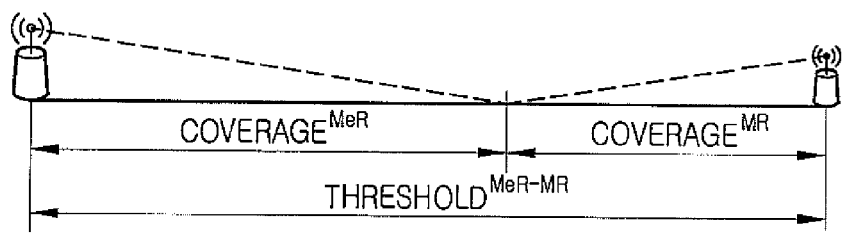
Figure 9:
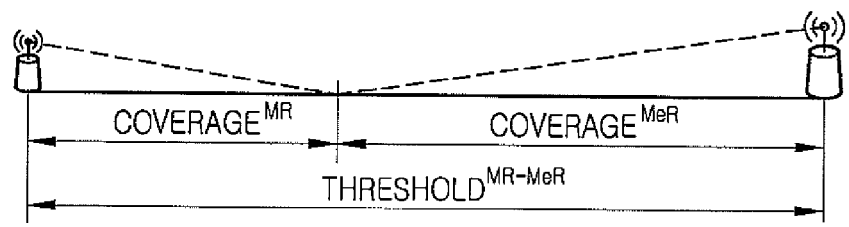
Figure 9:
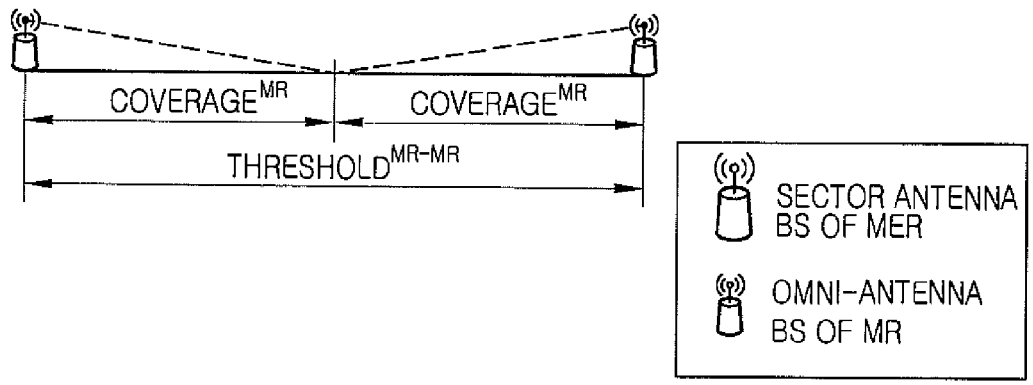

The BS1 200 broadcasts a Query Request (QUE_REQ) message 214. The QUE_REQ message 214 includes a type of the BS1 200, location information of the BS1 200, distance threshold, FA/PI list, broadcast range, broadcast number, message sequence number, and IP address of the BS1 200. Herein, the BS type indicates whether the BS1 200 is a sector antenna BS of the MeR or an omni-antenna BS of the MR. The distance threshold, which is a threshold for the distance between the BS1 200 and the neighbor BS, is set to a different value per BS as shown in FIG. 9. The distance threshold varies per BS because the coverage depends on the BS type. The FA/PI list indicates FAs and PIs obtained and stored by the BS1 200 using the surrounding environment detection function. The broadcast range indicates the number of hops for broadcasting the QUE_REQ message 214. The broadcast number indicates the number of broadcasts of the QUE_REQ message 214 via the BS1 200 and the neighbor BSs. Initially, the broadcast number is set to zero.

In step 216, a BSN 204 (which comprises any of the neighbor BSs) that receives the QUE_REQ message 214 determines to send a response message to the BS1 200 by comparing the distance to the BS1 200 with the distance threshold or by comparing the FA/PI list of the QUE_REQ message 214 with its FA/PI list. More specifically, the BSN 204 determines the distance to the BS1 200 by using its location information and the location information of the BS1 200 contained in the QUE_REQ message 214, obtains the distance threshold that corresponds to the type of the BS1 200 and the type of the BSN 204 from the distance thresholds of the QUE_REQ message 214, and compares the obtained distance threshold with the determined distance. For example, when the distance threshold varies according to the type of the two BSs, the BS1 200 is the sector antenna BS of the MeR, and the BSN 204 is the omni-antenna BS of the MR as shown in FIG. 9, the BSN 204 may select and compare the distance threshold of 2) or 3) with the determined distance.

When the determined distance is smaller than or equal to the corresponding distance threshold, or when the FA/PI list of the QUE_REQ message 214 and the FA/PI list of the BSN 204 include the same FA/PI, the BSN 204 may determine to send the response message to the BS1 200. The determination of the BSN 204 to send the response message to the BS1 200 shall be shall be later described with reference to FIG. 7.

The BSN 204 sends a Query Response (QUE_RSP) message 218 to the BS1 200. The QUE_RSP message 218 includes a type of the BSN 204, a BSID of the BSN 204, an IP address of the BSN 204, the FA/PI, location information of the BSN 204, distance information to the BS1 200, and the number of hops to the BS1 200. Herein, the number of hops to the BS1 200 may be set to the broadcast number of the QUE_REQ message 214. The BSN 204 broadcasts the message by changing the broadcast range and the broadcast number of the QUE_REQ message 214 received.

In step 220, the BS1 200 repeatedly re-broadcasts the QUE_REQ message 214 by increasing the broadcast range and the message sequence number, and receives the QUE_RSP message 218 in response. Herein, the BS1 200 includes the neighbor BSs that are sending the QUE_RSP message 218 to the candidate NBL. This operation, which is referred to as an expanding ring search, is repeated until the QUE_RSP message 218 is no longer received from any more neighbor BSs.

Upon not receiving the QUE_RSP message 218 from any more neighbor BSs, the BS1 200 generates the NBL based on the received QUE_RSP messages in step 222. The generation of the NBL shall be explained later with reference to FIG. 4.

The BS1 200 then sends a message (NB_CONS_ADD_REQ message 224), for requesting to add the neighbor BS, to the neighbor BSs of the NBL. The BSN 204 that receives this message determines whether to add the BS1 200 to its candidate NBL and NBL and updates or sustains the two lists in block 226, which shall be explained later with reference to FIG. 6.

The BSN 204 sends to the BS1 200 a response message (NB_CONS_ADD_RSP 228) for the neighbor BS addition. The response message for the neighbor BS addition indicates whether the BSN 204 adds the BS1 200 to its NBL.

The BS1 200 sends a NBL advertisement (MOB_NBR_ADV) message 230 that includes the NBL generated in block 222 to its MS 202.

Next the BS1 200 periodically broadcasts a Radio Access Station Advertisement (RAS_ADV) message 240. The RAS_ADV message 240 is periodically broadcast to update the NBL of the BS1 200 and the neighbor BSs by informing of the presence of the BS1 200 when network topology changes because of movement of the MR and breakage of the radio link. The RAS_ADV message 240 includes the type of the BS1 200, the BSID of the BS1 200, the IP address of the BS1 200, the location information of the BS1 200, the broadband range, the broadcast number, and the message sequence number.

In step 242, the BSN 204 that receives the RAS_ADV message 240 updates or sustains its candidate NBL and NBL based on the RAS_ADV message 240, which shall be explained later with reference to FIGS. 8A and 8B. Herein, when the NBL is updated, the BSN 204 may send the message (NB_CONS_ADD_REQ 224), requesting to add the neighbor BS, to the neighbor BSs of the NBL and receive responses (NB_CONS_ADD_RSP 228), in a substantially same manner as described with respect to BS1 200 and BSN 204.

Figure 3:
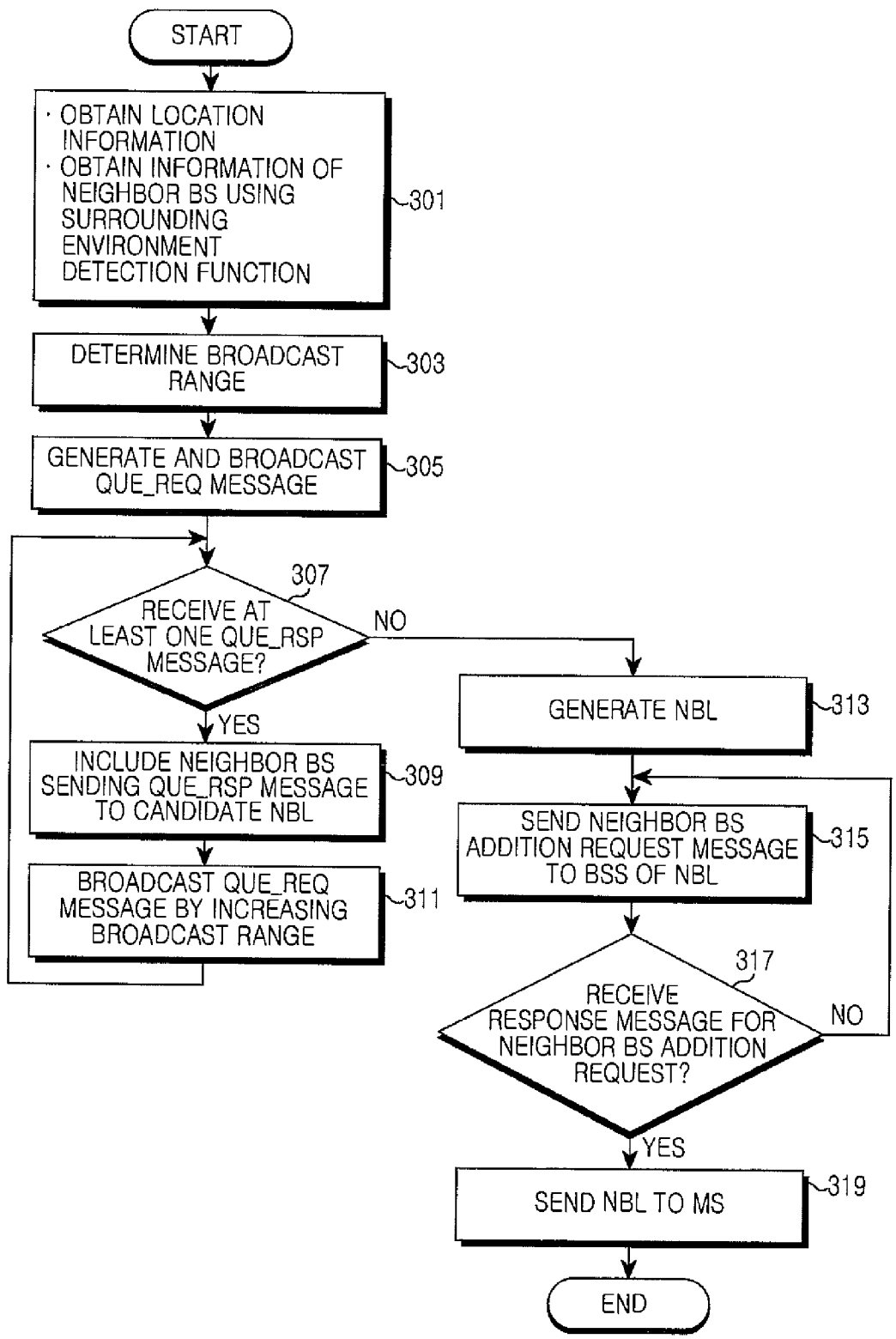
FIG. 3 illustrates a process of the base station for generating the neighbor base station list by collecting neighbor base station information in the distributed wireless ad-hoc network according to an embodiment of the present invention.

FIG. 3 illustrates a process of the BS for generating the NBL by collecting neighbor BS information in the distributed wireless ad-hoc network according to an embodiment of the present invention.

In step 301, the BS obtains its location information (e.g., (x, y) coordinates) using the GPS and obtains information of neighbor BSs using the surrounding environment detection function. The information of the neighbor BSs may include the FA and the PI of each neighbor BS and the RSSI and/or the CINR per FA/PI. The BS may compare the obtained RSSI and/or CINR per FA/PI with the threshold and store only the RSSIs and/or CINRs per FA/PI greater than the threshold. The BS may determine its FA and PI and the transmit power based on the information acquired using the surrounding environment detection function.

Figure 10:
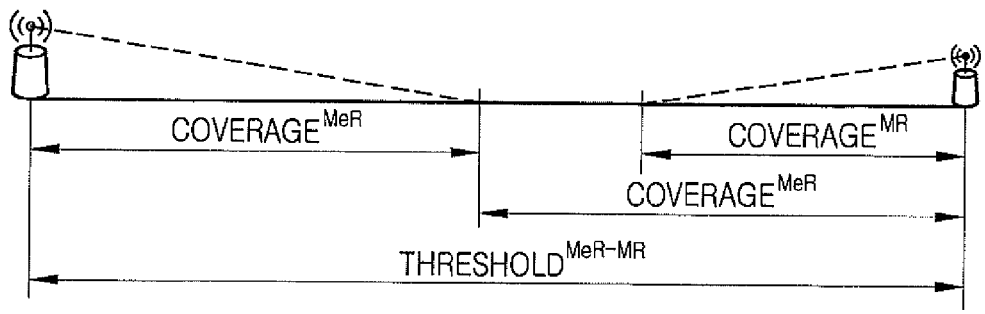
FIG. 10 illustrates neighbor base station information collection when the distance threshold is inappropriate in the distributed wireless ad-hoc network according to an embodiment of the present invention.
Figure 10:
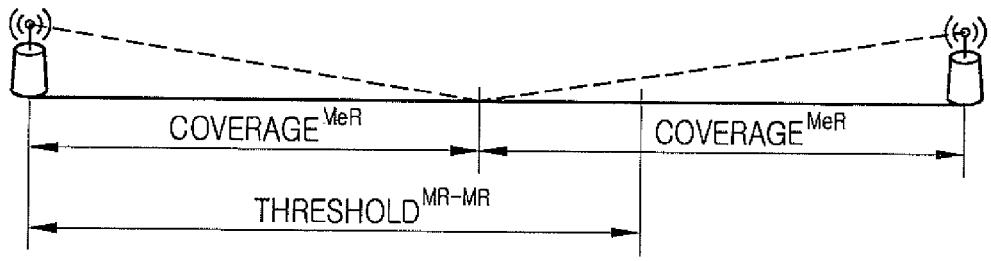
Figure 10:
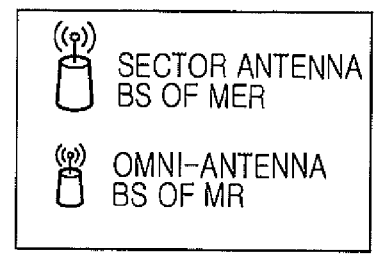

The BS determines the broadcast range in step 303, and generates and broadcasts the QUE_REQ message in step 305. The QUE_REQ message includes the type of the BS, the location information of the BS, the distance threshold, the FA/PI list, the broadcast range, the broadcast number, the message sequence number, and the IP address of the BS. The broadcast number is initially set to zero, the BS type indicates whether the BS is the sector antenna BS of the MeR or the omni-antenna BS of the MR, and the distance threshold, which is the threshold for the distance between the BS and the neighbor BS, varies according to the BS type as shown in FIG. 9. Because the coverage of the sector antenna BS of the MeR is greater than the coverage of the omni-antenna BS of the MR, the threshold per BS type has a relation $Threshold^{MeR\text{-}MeR} > Threshold^{MeR\text{-}MR} = Threshold^{MR\text{-}MeR} > Threshold^{MR\text{-}MR}$ as shown in FIG. 9. $Threshold^{MeR\text{-}MeR}$ denotes the threshold distance between the sector antenna BSs of the MeR, $Threshold^{MeR\text{-}MR}$ and $Threshold^{MR\text{-}MeR}$ denote the threshold distance between the sector antenna BS of the MeR and the omni-antenna BS of the MR, and $Threshold^{MR\text{-}MR}$ denotes the threshold distance between the omni-antenna BSs of the MR. As such, the different threshold distance is applied based on the BS type because the coverage varies according to the BS type, so as to prevent a situation in which the unnecessary BS is included to the NBL due to the excessively great distance threshold or a situation in which the necessary BS is not included to the NBL due to the excessively small distance threshold, as shown in FIG. 10.

Figure 12:
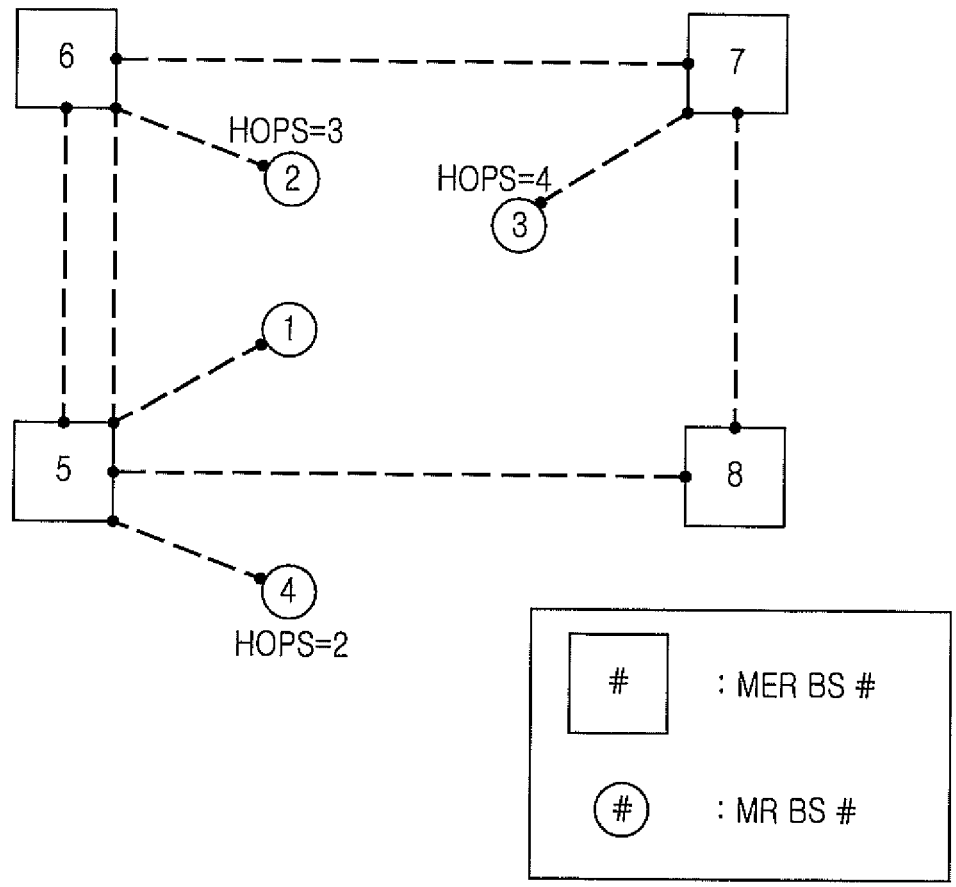
FIG. 12 illustrates the neighbor base stations collected according to a broadcast range in the distributed wireless ad-hoc network according to an embodiment of the present invention.

In step 307, the BS determines whether at least one QUE_RSP message is received. When receiving the QUE_RSP message, the BS includes the BSs that send the QUE_RSP message to the candidate NBL in step 309, re-broadcasts the QUE_REQ message by increasing the broadcast range in step 311, and then returns to step 307. Note that the message sequence number of the QUE_REQ message is also changed. Herein, the QUE_REQ message is re-broadcast by increasing the broadband range in order to discover neighbor BSs not yet detected. The rebroadcast is finished when the QUE_RSP message is not received from any other BSs. For example, in FIG. 12, provided that the BS1 broadcasts the QUE_REQ message and the BS2 through BS5 based on the BS1 satisfy a certain condition to be included to the NBL, when the broadcast range of the QUE_REQ message is 3, the BS1 may discover the BS2, the BS4, and the BS5. However, the BS3, which lies near the BS1, is not discovered because of the number hops between the BS1 and the BS3. When the BS1 re-broadcasts the QUE_REQ message by increasing the broadcast range from 3 to 4, the BS1 may detect the BS3.

In contrast, when the QUE_RSP message is not received, the BS generates the NBL using the candidate NBL in step 313, to be explained in more detail with reference to FIG. 4.

In step 315, the BS sends the message (NB_CONS_ADD_REQ) requesting to add the neighbor BS to the BSs belonging to the NBL. In step 317, the BS examines whether the response message (NB_CONS_ADD_RSP) for the neighbor BS addition is received from the neighbor BSs. Herein, the message requesting to add the neighbor BS includes the BSID and the IP address of the BS.

When the response messages (NB_CONS_ADD_RSP) for the neighbor BS addition is not received from all of the neighbor BSs, the BS returns to step 315 to re-send the message requesting to add the neighbor BS, to the BS from which the response message was not received.

When the response messages for the neighbor addition from all of the neighbor BSs are received, the BS transmits the NBL to the MS in step 319 and ends this process.

Figure 4:
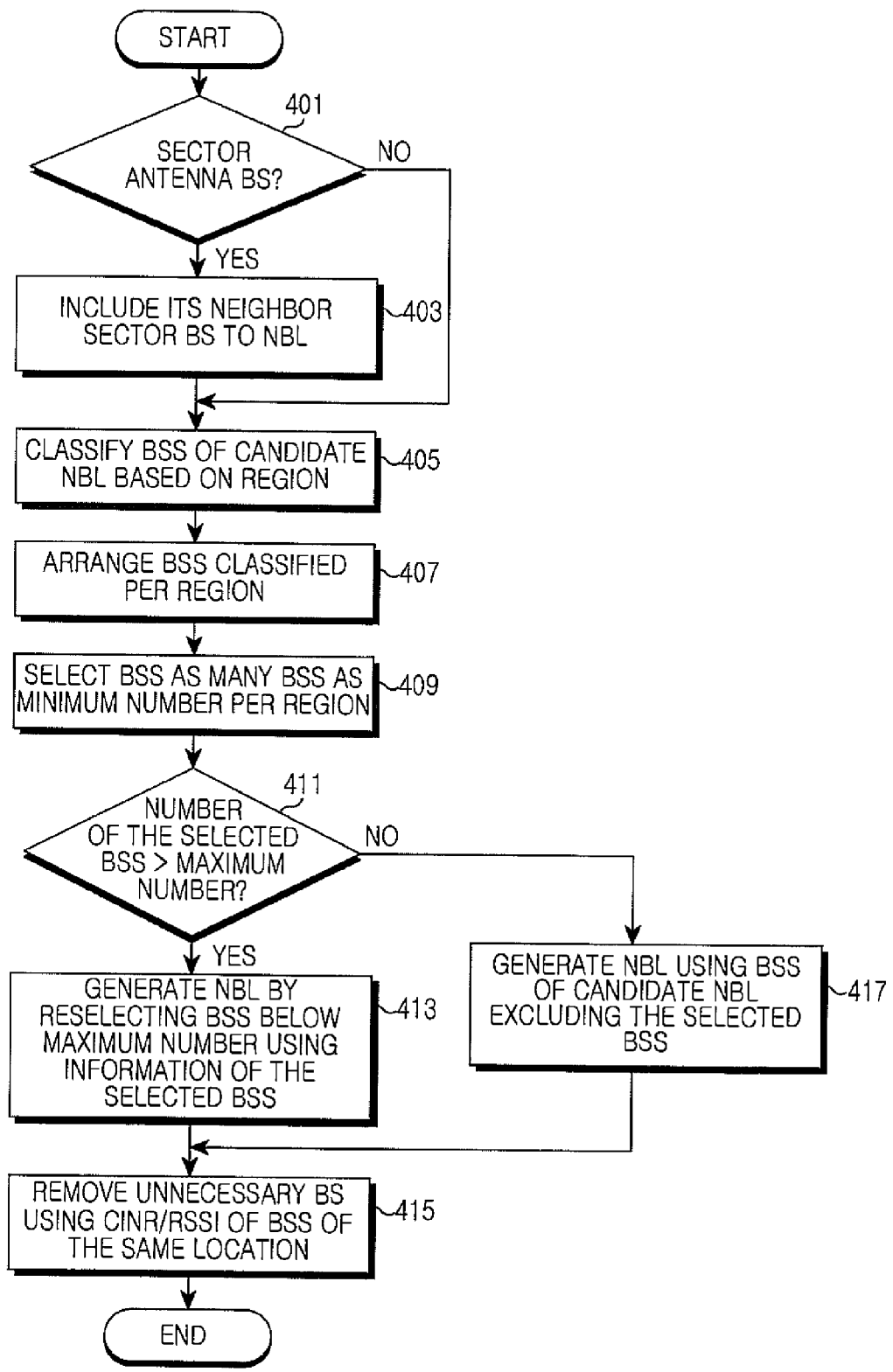
FIG. 4 illustrates a process of the base station for generating the neighbor base station list in the distributed wireless ad-hoc network according to an embodiment of the present invention.

FIG. 4 illustrates a process of the BS for generating the NBL in the distributed wireless ad-hoc network according to an embodiment of the present invention.

In step 401, the BS checks whether it is the sector antenna BS. When the BS is not the sector antenna BS, it goes to step 405. When the BS is the sector antenna BS, it includes its neighbor sector antenna BSs to NBL in step 403. For example, the BS1-1 in FIG. 14 may include its neighbor sector antenna BS1-2 and BS 1-3 to the NBL.

Figure 13:
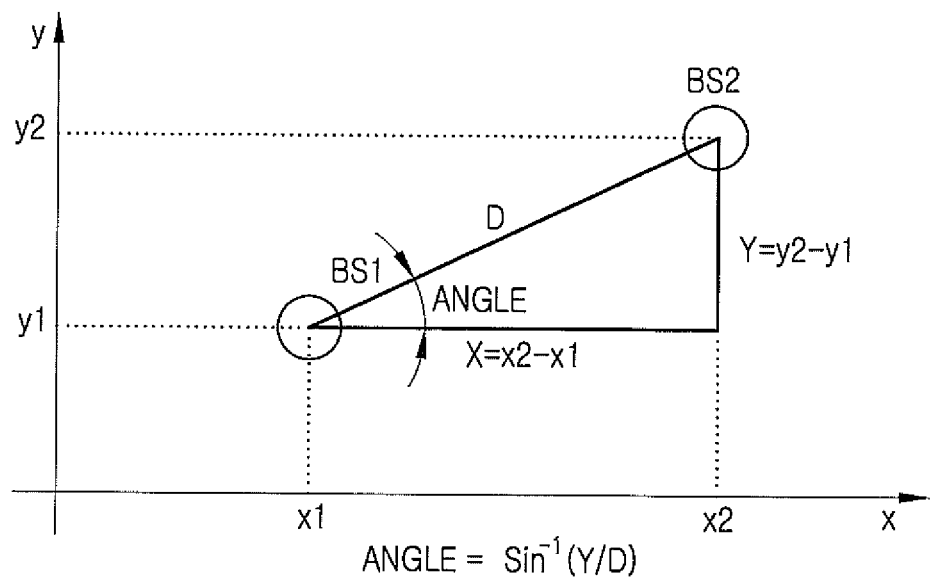
FIG. 13 illustrates direction determination of the base station in the distributed wireless ad-hoc network according to an embodiment of the present invention.

In step 405, the BS classifies the neighbor BSs belonging to a candidate NBL based on a region. In doing so, the BS may determine the direction of the neighbor BS by using its location information and the location information of each neighbor BS of the candidate NBL, divide the region direction angle from the BS, and classify the neighbor BSs into a plurality of groups. For example, the BS1 may determine an angle to the neighbor BS2 and group the neighbor BSs in four directions including 0~90 degrees, 90~180 degrees, 180~270 degrees, and 270~360 degrees as shown in FIG. 13. The regions are divided as such to support handoff in every direction because the MS may travel to any direction.

Figure 11:
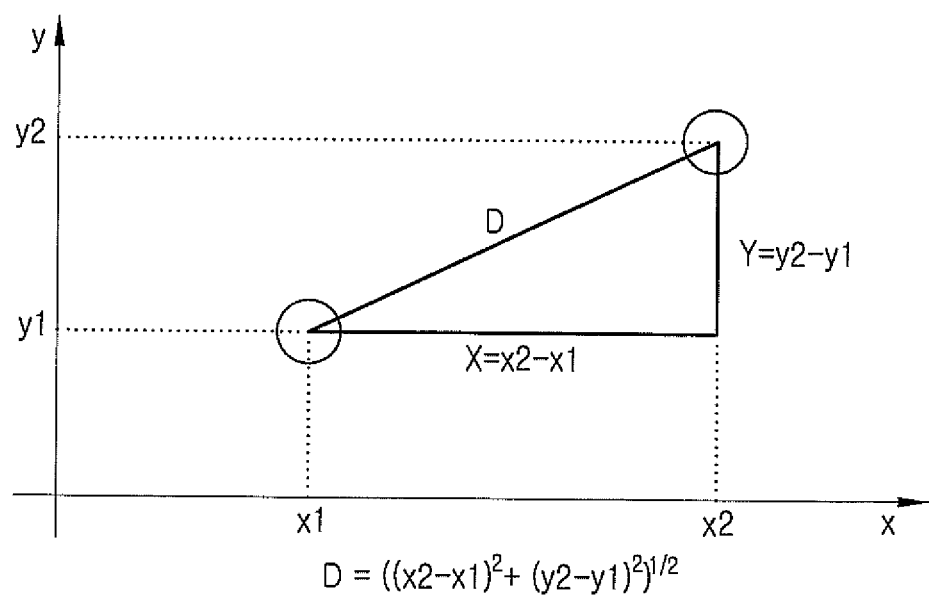
FIG. 11 illustrates determination of a distance between the base stations in the distributed wireless ad-hoc network according to an embodiment of the present invention.

The BS arranges the neighbor BSs classified per region based on the region in step 407. The BS may also arrange the neighbor BSs according to the CINR or the RSSI, and according to the distance to the neighbor BS. Herein, the distance between the BS and the neighbor BS may be determined using location coordinates of the two BSs as shown in FIG. 11. Also, the BS may arrange the neighbor BSs according to a standard distance (the distance between the BS and the neighbor BS/distance threshold*100) between the BS and the neighbor BS, or using rank information acquired by combining the distance, the standard distance, and the CINR or the RSSI.

In step 409, the BS selects as many BSs as a predetermined first threshold number per region from the neighbor BSs classified per region. For example, when the number of the neighbor BSs belonging to the region A is smaller than or equal to the predetermined first threshold number, the BS selects all the neighbor BSs of the A region. When the number of the neighbor BSs belonging to the region A is greater than the predetermined first threshold number, the BS selects the neighbor BSs corresponding to the predetermined first threshold number in the arranged order.

In step 411, the BS compares the number of the selected neighbor BSs with a predetermined second threshold number. That is, when the regions are divided into A through D and the neighbor BSs below or equal to the predetermined second threshold number are selected per region, the BS compares the total number of the neighbor BSs selected in the regions A through D with the predetermined second threshold number.

When the total number of the selected neighbor BSs is smaller than the predetermined second threshold number, the BS further selects the neighbor BSs among the unselected neighbor BSs of the candidate NBL in order to make the number of selected neighbor BSs to be the second threshold number, and generates the NBL accordingly in step 417. The BS may select the neighbor BSs in the descending order using at least one of the CINR or RSSI value, the distance between the BS and the neighbor BS, the standard distance between the BS and the neighbor BS, and the rank information. Next, the BS proceeds to step 415.

In contrast, when the number of the selected neighbor BSs is greater than the predetermined second threshold number, the BS reselects neighbor BSs below the predetermined second threshold number using the information of the selected neighbor BSs and generates the NBL by including the reselected neighbor BSs in step 413. The BS may be able to arrange the selected neighbor BSs using at least one of the CINR or RSSI value, the distance between the BS and the neighbor BS, the standard distance between the BS and the neighbor BS, rank the information and then reselect neighbor BSs of the high order.

Figure 14:
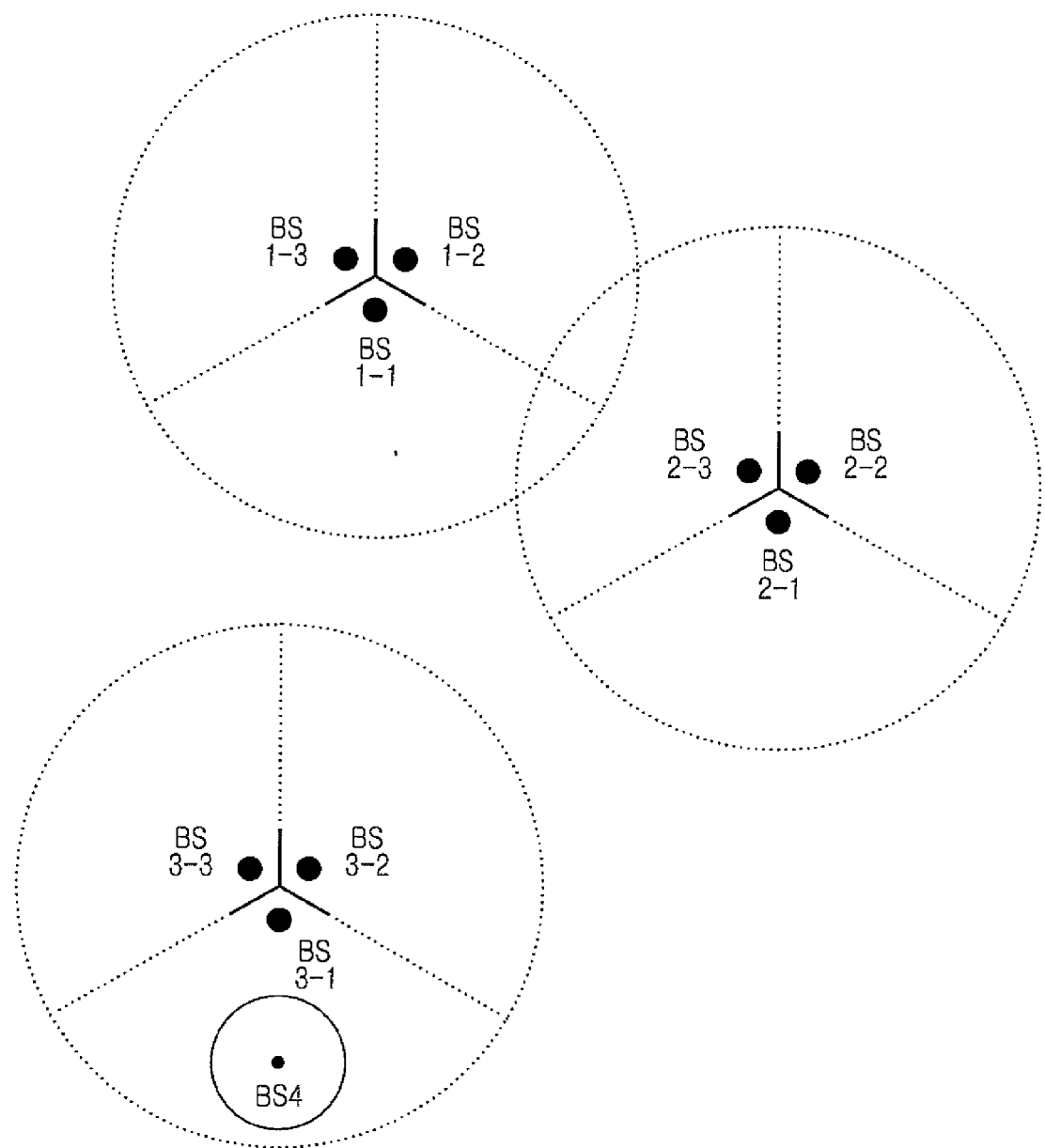
FIG. 14 illustrates a sector antenna base station in the distributed wireless ad-hoc network according to an embodiment of the present invention.

In step 415, the BS eliminates unnecessary neighbor BSs using the CINR or the RSSI of the BSs of the same location. More specifically, the BS determines an average CINR or an average RSSI and a CINR standard deviation or an RSSI standard deviation with respect to the BS group of the same location (i.e., the BSs belonging to the sector antenna BS set among the neighbor BSs of the NBL) and removes the neighbor BSs with poor reception performance based on the determined value. For example, the BS removes the neighbor BS for which the CINR is below 'average CINR—a*CINR standard deviation' or the neighbor BS for which the RSSI is below 'average RSSI—a*RSSI standard deviation' from the NBL. In an embodiment, 'a' denotes a weight that ranges from 0 to 1.0. When the NBL is generated using any one of the distance between the BS and the neighbor BS, the standard distance between the BS and the neighbor BS, and the rank information, it is highly likely that the NBL includes the unnecessary neighbor BS. Thus, such a process is to remove the unnecessary neighbor BSs. For example, in FIG. 14, while the NBL of the BS1-1 may include all of the BS 2-1, the BS 2-2, and the BS 2-3, the BS1-1 lies close only to the BS 2-3 because the sector antenna transmits and receives signals in a particular direction. That is, because the list of the BS1-1 unnecessarily includes the BS 2-1 and the BS 2-2, the BS 2-1 and the BS 2-2 may be removed. Because the omni-antenna BS 4, which has the small coverage, belongs to one sector BS, it lies close to the BS 3-1 alone as shown in FIG. 14. However, the NBL of the BS 4 may include the BS 3-2 and the BS 3-3. In this situation, the BS 3-2 and the BS 3-3 may be removed from the NBL of the BS 4. In an embodiment, the step 415 may be performed before the step 411.

Next, the BS ends this process.

Figure 5:
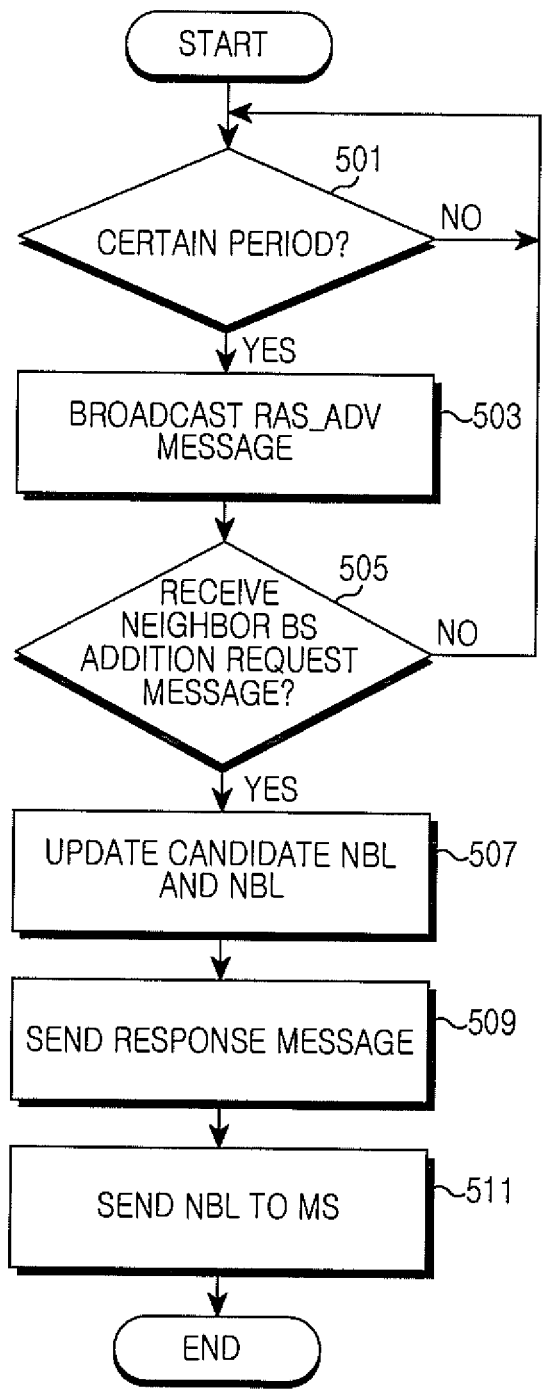
FIG. 5 illustrates a process of the base station for updating the neighbor base station list by periodically sending messages in the distributed wireless ad-hoc network according to an embodiment of the present invention.

FIG. 5 illustrates a process of the BS for updating the NBL by periodically sending messages in the distributed wireless ad-hoc network according to an embodiment of the present invention.

In step 501, the BS checks whether a preset period arrives. At the period, the BS broadcasts the RAS_ADV message in step 503. The RAS_ADV message is periodically broadcast to update the NBL of the BS and the neighbor BSs by informing of the presence of the BS when the network topology changes because of the movement of the MR and the breakage of the radio link. The RAS_ADV message includes the type of the BS, the BSID of the BS, the IP address of the BS, the location information of the BS, the broadband range, the broadcast number, and the message sequence number. Herein, the broadcast range is determined as the greatest number of hops from the neighbor BS to the BS among the neighbor BSs of the current NBL.

In step 505, the BS determines whether a neighbor BS addition request message is received. If the neighbor BS addition request message is not received, the BS returns to step 501. Upon receiving the neighbor BS addition request message, the BS updates or maintains the candidate NBL and the NBL in step 507. Herein, receiving the neighbor BS addition requests message and updating or maintaining the candidate NBL and the NBL are fulfilled in a manner substantially similar to the process illustrated in FIG. 6.

In step 509, the BS transmits a response message to the BS from which the neighbor BS addition request message was received. In step 511, the BS sends its NBL to the MS. Notably, when the NBL is not updated in step 507, the BS may not send its NBL to the MS.

Next, the BS ends this process.

Figure 6:
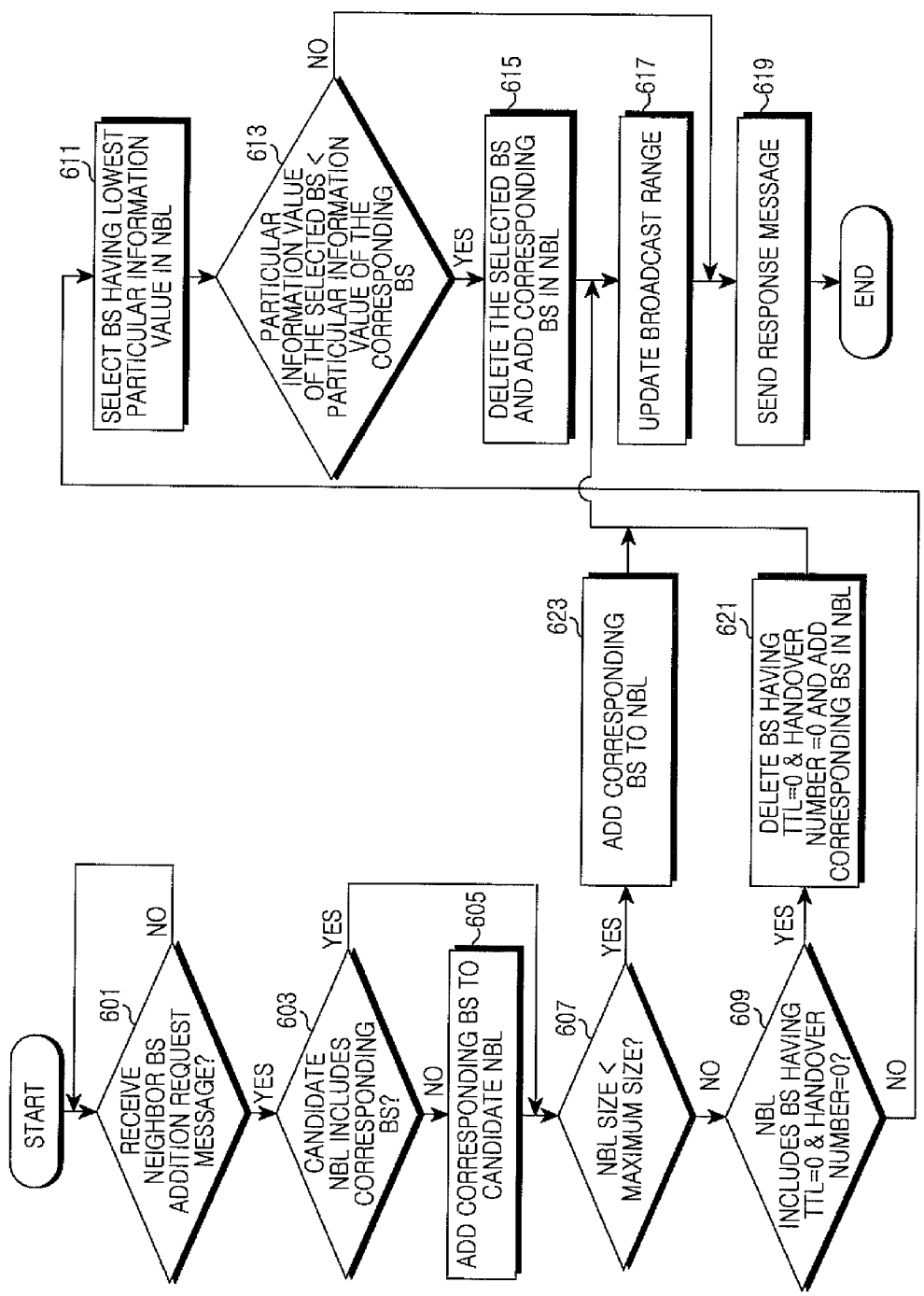
FIG. 6 illustrates a process of the base station for updating the neighbor base station list according to a request of the neighbor base station in the distributed wireless ad-hoc network according to an embodiment of the present invention.

FIG. 6 illustrates a process of the BS for updating the NBL according to a request of the neighbor BS in the distributed wireless ad-hoc network according to an embodiment of the present invention.

In step 601, the BS checks whether a neighbor BS addition request message is received. Upon receiving the neighbor BS addition request message, the BS examines whether the corresponding BS (i.e., the BS from which the neighbor BS addition request message was received) is included in the candidate NBL in step 603. Herein, because the neighbor BS addition request message includes the BSID and the IP address of the transmitter BS, the BS may determine whether the transmitter BS is included to the candidate NBL using the BSID and the IP address.

When the corresponding BS is included in the candidate NBL, the BS goes to step 607. When the corresponding BS is not included to the candidate NBL, the BS adds the corresponding BS to the candidate NBL in step 605.

In step 607, the BS checks whether the size of its NBL is greater than a preset maximum size. When the NBL size is smaller than the maximum size, the BS adds the corresponding BS to the NBL in step 623 and then goes to step 617.

In contrast, when the NBL size is greater than or equal to the maximum size, the BS examines whether the NBL includes a neighbor BS for which 'Time To Live (TTL)=0' and 'number of handoffs=0' in step 609. When the NBL includes the neighbor BS for which 'the TTL=0' and 'the number of handoffs=0', the BS deletes the neighbor BS for which 'the TTL=0' and 'the number of handoffs=0' from the NBL and adds the corresponding BS in step 621, and then goes to step 617.

When the NBL does not include the neighbor BS for which 'the TTL=0' and 'the number of handoffs=0', the BS selects a neighbor BS with a lowest particular information value in the NBL in step 611. In an embodiment, the lowest particular information value indicates at least one of the CINR or RSSI value, an inverse number of the distance between the BS and the neighbor BS, an inverse number of the standard distance (the distance between the BS and the neighbor BS/distance threshold*100) of the BS and the neighbor BS, and a rank value. In an embodiment, the rank value is acquired based on at least two of the distance, the standard distance, the CINR, and the RSSI.

In step 613, the BS examines whether the particular information value of the selected neighbor BS is smaller than a particular information value of the corresponding BS. When the particular information value of the selected neighbor BS is greater than or equal to the particular information value of the corresponding BS, the BS determines not to add the corresponding BS into the NBL and then goes to step 619.

In contrast, when the particular information value of the selected neighbor BS is smaller than the particular information value of the corresponding BS, the BS removes the selected neighbor BS from the NBL and adds the corresponding BS to the NBL in step 615.

In step 617, the BS updates the broadcast range. When the current broadcast range is smaller than the hops between the BS and the corresponding BS, the BS updates the current broadcast range with the hops between the BS and the corresponding BS. When the current broadcast range is greater than or equal to the hops between the BS and the corresponding BS, the BS sustains the current broadcast range.

In step 619, the BS generates and sends to the corresponding BS a neighbor BS addition response message indicating whether the corresponding BS is added to the NBL. Next, the BS ends this process.

Figure 7:
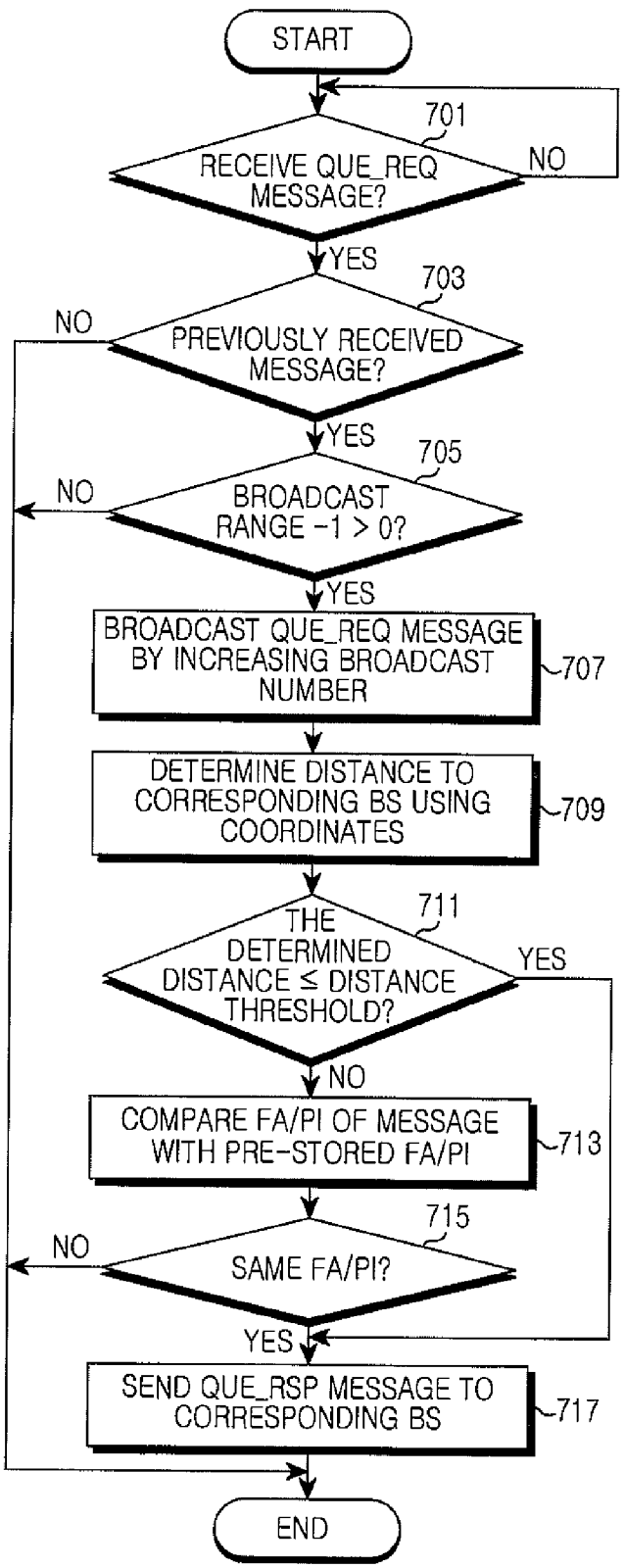
FIG. 7 illustrates a process of the base station for responding to another base station which collects the neighbor base station information in the distributed wireless ad-hoc network according to an embodiment of the present invention.

FIG. 7 illustrates a process of a BS for responding to another BS that is collecting the neighbor BS information in the distributed wireless ad-hoc network according to an embodiment of the present invention.

In step 701, the BS checks whether a QUE_REQ message is received from other (i.e. transmitting) BS. Upon receiving the QUE_REQ message from the other BS, the BS determines whether the received QUE_REQ message is a previously received message in step 703. That is, the BS examines whether the QUE_REQ message was previously received based on the BS IP address and the message sequence number of the QUE_REQ message. If the QUE_REQ message was previously received, the BS discards the QUE_REQ message and ends this process.

In contrast, when the QUE_REQ message was not previously received, the BS obtains the broadcast range from the QUE_REQ message and checks whether the difference of the broadcast range—'1' is greater than zero in step 705. When the difference of the broadcast range—'1' is not greater than zero, the BS determines not to broadcast the QUE_REQ message any more, discards the QUE_REQ message, and then ends this process.

In contrast, when the difference of the broadcast range—1 is greater than zero, the BS broadcasts the QUE_REQ message by increasing the broadcast number by one in step 707. It is noted that the broadcast range of the broadcast QUE_REQ message is updated with the value acquired by subtracting 1. Here, as in FIG. 2, the broadcast range indicates the number of hops for broadcasting the QUE_REQ message. The broadcast number indicates the number of broadcasts of the QUE_REQ message via the BS1 and the neighbor BSs. Initially, the broadcast number is set to zero.

In step 709, the BS determines the distance to the other BS based on the location coordinates of the BS and the other BS. The distance between the BS and the other BS may be determined as shown in FIG. 11.

In step 711, the BS determines whether the determined distance is less than or equal to the distance threshold of the QUE_REQ message. Herein, the BS uses the distance threshold corresponding to its BS type and the type of the other BS among the distance thresholds of the QUE_REQ message. For example, when the BS is the MR omni-antenna BS and the other BS is the MeR sector antenna BS, the BS may select and compare Threshold$^{MeR-MR}$ of 2) or Threshold$^{MR-MeR}$ of 3) of the distance thresholds in FIG. 9, with the determined distance.

When the determined distance is less than or equal to the distance threshold, the BS sends the QUE_RSP message to the other BS in step 717.

In contrast, when the determined distance is greater than the distance threshold, the BS compares the FA/PI of the QUE_REQ message with its stored FA/PI list in step 713. When there is no matching FA/PI in step 715, the BS ends this process. Alternatively, when there is an FA/PI match in step 715, the BS sends the QUE_RSP message to the other BS in step 717 and then ends this process. Herein, when transmitting the QUE_RSP message, the BS may store BS information contained in the corresponding QUE_REQ message to update its NBL.

Figure 8A:
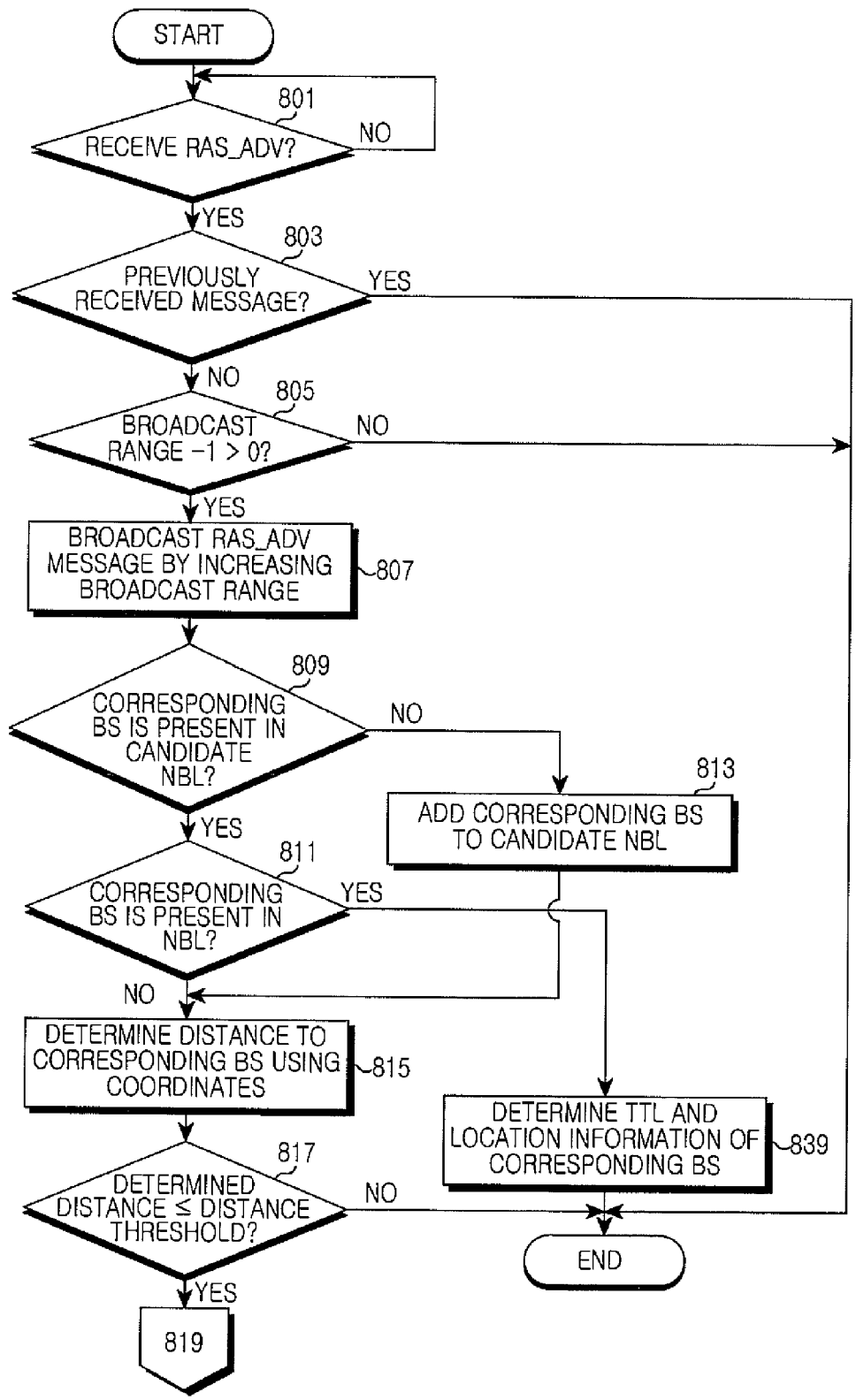
FIGS. 8A and 8B illustrate a process of the base station for updating the neighbor base station list by periodically receiving messages in the distributed wireless ad-hoc network according to an embodiment of the present invention.
Figure 8B:
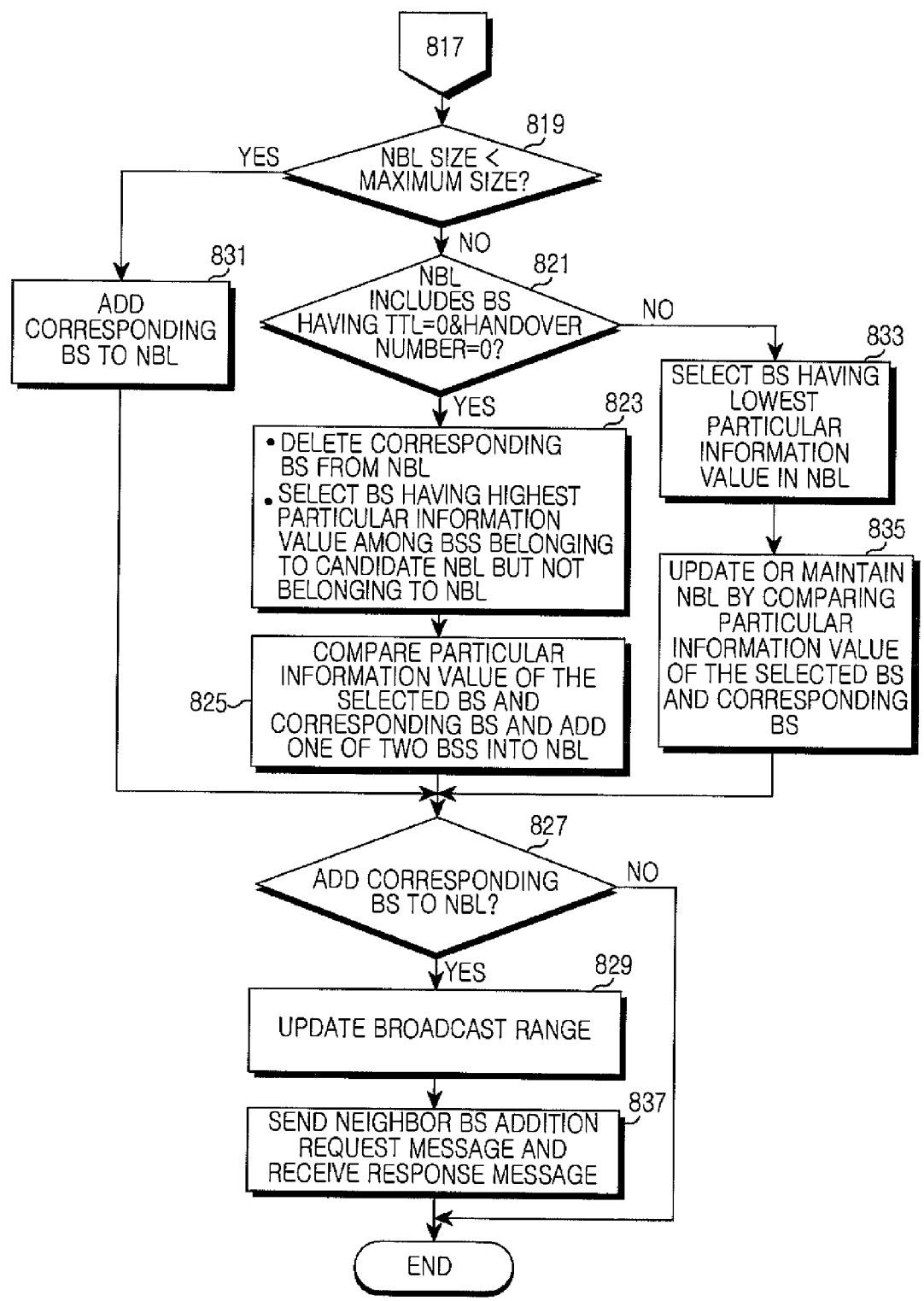

FIGS. 8A and 8B illustrate a process of the BS for updating the NBL by periodically receiving messages in the distributed wireless ad-hoc network according to an embodiment of the present invention.

In step 801, the BS checks whether the RAS_ADV message is received. Herein, the RAS_ADV message includes the type of the transmitter BS, the BSID, the IP address, the location information, the broadcast range, the broadcast number, and the message sequence number.

Upon receiving the RAS_ADV message, the BS checks whether the RAS_ADV message is a previously received message in step 803. That is, the BS examines whether the RAS_ADV message was previously received, using the BS IP address and the message sequence number of the RAS_ADV message. When the RAS_ADV message is previously received, the BS discards the RAS_ADV message and ends this process.

When the RAS_ADV message is not the previously received message, the BS obtains the broadcast range from the RAS_ADV message and determines whether the difference obtained by subtracting '1' from the broadcast range is greater than zero in step 805. When the difference of the broadcast range—'1' is not greater than zero, the BS determines not to broadcast the RAS_ADV message any more, discards the corresponding message, and then ends this process.

When the difference of the broadcast range—'1' is greater than zero, the BS broadcasts the RAS_ADV message by increasing the broadcast number by one in step 807. The broadcast range of the broadcast QUE_REQ message is updated with 'the broadcast range—1'. Here, as in FIG. 2, the broadcast range indicates the number of hops for broadcasting the QUE_REQ message. The broadcast number indicates the number of broadcasts of the QUE_REQ message via the BS1 and the neighbor BSs. Initially, the broadcast number is set to zero.

In step 809, the BS determines whether the corresponding BS (i.e., the transmitter BS of the RAS_ADV message) is present in its candidate NBL. When the corresponding BS is not present in the candidate NBL, the BS adds the corresponding BS to the candidate NBL in step 813 and then proceeds to step 815.

In contrast, when the corresponding BS is present in the candidate NBL, the BS determines whether the corresponding BS is present in the NBL in step 811. When the corresponding BS is present in the NBL, the BS updates the TTL and the location information of the corresponding BS. At this time, the TTL is updated with sum of the TTL and a maximum TTL interval (Max_TTL_Interval), and the location information is updated with the location coordinates of the corresponding BS contained in the RAS_ADV message.

In contrast, when the corresponding BS is not present in the NBL, the BS determines the distance between the BS and the corresponding BS using the location coordinates of the BS and the corresponding BS in step 815. Herein, the distance between the BS and the corresponding BS may be determined as shown in FIG. 11.

In step 817, the BS checks whether the determined distance is smaller than or equal to the distance threshold. In an embodiment, the BS uses the distance threshold corresponding to its BS type and the type of the corresponding BS. For example, when both of the BS and the corresponding BS are the MR omni-antenna BSs, the BS may select Threshold$^{MR-MR}$ of 4) among the distance thresholds in FIG. 9 and compare it with the determined distance.

When the determined distance is greater than the distance threshold, the BS does not add the corresponding BS to the NBL and ends this process.

When the determined distance is smaller than or equal to the distance threshold, the BS checks whether its NBL size is greater than a preset maximum size in step 819. When the NBL size is smaller than the maximum size, the BS adds the corresponding BS to the NBL in step 831 and goes to step 827.

In contrast, when the NBL size is greater than or equal to the maximum size, the BS determines whether the NBL includes a neighbor BS for which 'TTL=0' and 'handoff number=0' in step 821.

When the NBL includes the neighbor BS for which 'TTL=0' and 'handoff number=0', the BS deletes the neighbor BS for which 'TTL=0' and 'handoff number=0' from the NBL and selects the BS with a highest particular information value among the BSs belonging to the candidate NBL of the BS but not belonging to the NBL in step 823. In an embodiment, the particular information value indicates at least one of the CINR or RSSI value, the inverse number of the distance between the BS and the neighbor BS, the inverse number of the standard distance (the distance between the BS and the neighbor BS/distance threshold*100) of the BS and the neighbor BS, and the rank value. In an embodiment, the rank value is acquired by combining the distance, the standard distance, and the CINR or the RSSI.

In step 825, the BS compares the particular information value of the selected BS and the particular information value of the corresponding BS and adds one of the two into the NBL. That is, the BS adds the BS of the higher particular information value among the selected BS and the corresponding BS to the NBL and proceeds to step 827.

Meanwhile, when the NBL does not include the neighbor BS for which 'TTL=0' and 'handoff number=0', the BS selects the BS with the lowest particular information value in the NBL in step 833 and updates or sustains the NBL by comparing the particular information value of the selected BS with the particular information value of the corresponding BS in step 835. In detail, when the particular information value of the selected BS is lower than the particular information value of the corresponding BS, the BS deletes the selected BS and adds the corresponding BS in the NBL. Otherwise, the BS maintains the NBL.

In step 827, the BS examines whether the corresponding BS is added to the NBL. When the corresponding BS is not added to the NBL, the BS ends this process. When the corresponding BS is added to the NBL, the BS updates the broadcast range in step 829. When the current broadcast range is smaller than the hops between the BS and the corresponding BS, the BS updates the current broadcast range with the hops between the BS and the corresponding BS. Alternatively, when the current broadcast range is greater than or equal to the hops between the BS and the corresponding BS, the BS sustains the current broadcast range.

In step 837, the BS sends the neighbor BS addition request message to the corresponding BS and receives a response message. Next, the BS ends this process. Notably, even when a particular BS belonging to the candidate NBL is added to the NBL, the BS may be able to send the neighbor BS addition request message to the particular BS.

Figure 15:
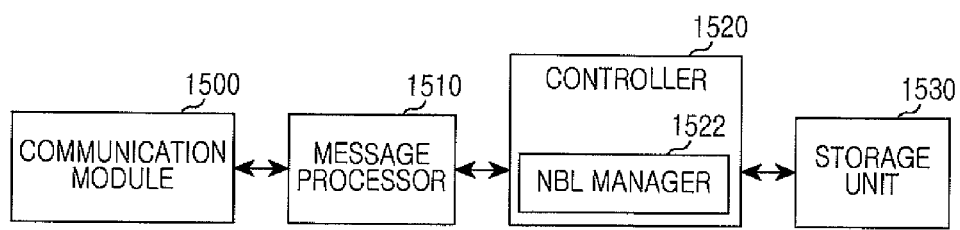
FIG. 15 illustrates the base station in the distributed wireless ad-hoc network according to an embodiment of the present invention.

FIG. 15 illustrates a step diagram of the BS in the distributed wireless ad-hoc network according to an embodiment of the present invention. In an embodiment, the BS may be the sector antenna BS or the omni-antenna BS.

The BS of FIG. 15 includes a communication module 1500, a message processor 1510, a controller 1520, and a storage unit 1530.

The communication module 1500 transmits and receives radio signals to and from other BSs through a wireless backbone interface. For example, under the control of the controller 1520, the communication module 1500 broadcasts the message generated by the message processor 1510 over an antenna (not shown) and receives the message broadcast from other BS over the antenna (not shown). Also, the communication module 1500 wirelessly communicates with the MS. In particular, under the control of the controller 1520, the communication module 1500 may detect the FA and the PI used by the neighbor BS using the surrounding environment detection function (the OTAR), and measure the CINR and the RSSI per FA/PI.

The message processor 1510 analyzes the message output from the communication module 1500 and provides the analyzed message to the controller 1520, and generates and outputs a message to the communication module 1500 under the control of the controller 1520.

The controller 1520 controls and processes operations of the BS. The controller 1520, which includes an NBL manager 1522, controls and processes to generate and update the candidate NBL and the NBL.

The NBL manager 1522 detects neighbor BSs based on the information obtained using the surrounding environment detection function, generates the QUE_REQ message by receiving the location information via a GPS receiver (not shown), and controls to transmit the message to the detected neighbor BSs. Next, the NBL manager 1522 adds the BSs from which the QUE_RSP message is received in response to the QUE_REQ message, into the candidate NBL. The NBL manager 1522 controls and processes the expanding ring search which re-broadcasts the QUE_REQ message by modifying the broadcast range of the QUE_REQ message until the QUE_RSP message is not received from any other BS. By including the distance threshold per BS type into the QUE_REQ message, the NBL manager 1522 may receive the QUE_RSP messages from the neighbor BSs which satisfy the distance threshold.

The NBL manager 1522 controls and processes to generate the NBL based on the candidate NBL. That is, the NBL manager 1522 generates the NBL by selecting neighbor BSs below the predetermined second threshold number from the neighbor BSs of the candidate NBL. To select the neighbor BSs below the predetermined second threshold number from the neighbor BSs of the candidate NBL, the NBL manager 1522 may utilize the CINR or the RSSI value of the corresponding neighbor BS, the distance between the BS and the corresponding neighbor BS, the standard distance (the distance between the BS and the corresponding neighbor BS/distance threshold*100) of the BS and the corresponding neighbor BS, and the rank information of the corresponding neighbor BS. In an embodiment, the rank information indicates the information based on at least one of the distance, the standard distance, and the CINR or the RSSI.

The NBL manager 1522 updates the NBL with the message received through the communication module 1500. In detail, the NBL manager 1522 adds the transmitter neighbor BS to the NBL or maintains the current NBL using the information of the neighbor BS which sends the received message and the information of the neighbor BSs of the current NBL. When receiving the broadcast message, the NBL manager 1522 controls and processes to broadcast or discard the corresponding message according to the broadcast range of the corresponding message.

That is, the NBL manager 1520 controls and processes to generate and update the candidate NBL and the NBL as shown in FIGS. 3 through 8B.

The storage unit 1530 stores programs and data for the operations of the BS, the FA and the PI collected using the surrounding environment detection function, and the CINR and the RSSI per FA/PI. The storage unit 1530 also stores the candidate NBL and the NBL. In doing so, the storage unit 1530 may map the information of the neighbor BS carried by the messages to the neighbor BSs of the candidate NBL and the NBL. Under the control of the controller 1520, the storage unit 1530 stores the TTL and the number of the handoffs of the BSs of the NBL.

As set forth above, the BS in the distributed wireless ad-hoc network collects the information of the neighbor BS by using the surrounding environment detection function and generates and manages the NBL by sending and receiving the messages to and from the neighbor BS. Therefore, it is possible to generate and update the NBL in accordance with the non-robust and poor environment such as wireless backbone network.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a Base Station (BS) for managing a neighbor BS list (NBL) in a distributed wireless ad-hoc network, the method comprising:
    collecting, at the BS, information of neighbor BSs using a surrounding environment detection function;
    determining information of the BS based on the collected information of the neighbor BSs;
    transmitting a request message based on the determined information of the BS to the neighbor BSs;
    receiving a response message from at least one of the neighbor BSs;
    determining neighbor BSs that satisfy a first condition, among the neighbor BSs from which the information is collected;
    generating the NBL based on the determined neighbor BSs; and
    when receiving the response message, retransmitting the request message by increasing a broadcast range of the request message.

2. The method of claim 1, wherein the request comprises a threshold distance from the BS.

3. The method of claim 2, wherein the request message further comprises at least one of a type of the BS, location information, an IP address, a distance threshold per BS type, frequency information and preamble information list, a broadcast range, a broadcast number, and a message sequence number.

4. The method of claim 1, further comprising: wherein retransmitting the request message by increasing the broadcast range is repeated until no response message is received for the retransmitted request message.

5. The method of claim 1, wherein generating the NBL comprises: dividing the determined neighbor BSs into a plurality of groups based on a direction; selecting up to a number of neighbor BSs for each group; and removing a neighbor BS for which a signal strength does not satisfy a signal condition from the selected neighbor BSs.

6. The method of claim 1, further comprising: after generating the NBL, receiving a request message comprising a second condition; determining whether the second condition is satisfied; and when the second condition is satisfied, sending a response message to a BS from which the request message was received, wherein the second condition is that a distance between the BS and the BS from which the request message was received is lower than a distance threshold based on a BS type.

7. The method of claim 6, wherein the response message comprises at least one of a type of the BS, a BS ID, an IP address, location information, frequency information and preamble information list, distance information to the transmitter BS, and a number of hops.

8. The method of claim 6, further comprising: when receiving the request message, determining whether the broadcast range in the request message satisfies a third condition; and when the broadcast range in the request message satisfies the third condition, updating the broadcast range and the broadcast number of the request message and broadcasting the request message to the neighbor BSs.

9. The method of claim 1, further comprising: after generating the NBL, sending a neighbor BS addition request message to the neighbor BSs of the NBL; and receiving a response message for the neighbor BS addition request message.

10. The method of claim 1, further comprising: after generating the NBL, receiving a neighbor BS addition request message; and determining whether to add a transmitting BS that transmitted the neighbor BS addition request message to the NBL; wherein whether to add the transmitting BS into the NBL is determined based on at least one of a Time To Live (TTL) and a number of handoffs of the BSs in the NBL, a Received Signal Strength Indicator (RSSI) of the transmitting BS, a Carrier to Interference-and-Noise Ratio (CINR) of the transmitting BS, a distance to the transmitting BS, a standard distance to the transmitting BS, and a rank value.

11. An apparatus of a Base Station (BS) for managing a neighbor BS list (NBL) in a distributed wireless ad-hoc network, the apparatus comprising:
a communication module configured to communicate with a neighbor BS over a wireless backbone link; and
a controller configured to:
collect information of neighbor BSs using a surrounding environment detection function,
determine information of the BS based on the collected information of the neighbor BSs,
transmit a request message based on the determined information of the BS to the neighbor BSs,
receive a response message from at least one of the neighbor BSs;
determine neighbor BSs that satisfy the first condition among the neighbor BSs from which the information is collected, and
generate the NBL based on the determined neighbor BSs, and
when receiving the response message for the request message, retransmitting the request message by increasing a broadcast range of the request message.

12. The apparatus of claim 11, wherein the request message comprises a threshold distance from the BS.

13. The apparatus of claim 12, wherein the request message further comprises at least one of a type of the BS, location information, an IP address, a distance threshold per BS type, frequency information and preamble information list, a broadcast range, a broadcast number, and a message sequence number.

14. The apparatus of claim 11, wherein the controller controls to repeatedly retransmit the request message by increasing the broadcast range until no response message is received for the retransmitted request message.

15. The apparatus of claim 11, wherein the controller divides the determined neighbor BSs into a plurality of groups based on a direction, selects up to a number of neighbor BSs for each group, and removes a neighbor BS for which a signal strength does not satisfy a signal condition from the selected neighbor BSs.

16. The apparatus of claim 11, wherein, after the NBL is generated and a request message comprising a second condition is received, the controller determines whether the second condition is satisfied, and controls to sends a response message to a BS from which the request message was received when the second condition is satisfied, and the second condition is that a distance between the BS and the BS from which the request message was received is lower than a distance threshold based on a BS type.

17. The apparatus of claim 16, wherein the response message comprises at least one of a type of the BS, a BS ID, an IP address, location information, frequency information and preamble information list, distance information to the transmitter BS, and a number of hops.

18. The apparatus of claim 16, wherein, upon receiving the request message, the controller determines whether the broadcast range in the request message satisfies a third condition, and when the broadcast range in the request message satisfies the preset condition, controls to update the broadcast range and the broadcast number of the request message and to broadcast the request message to the neighbor BSs.

19. The apparatus of claim 11, wherein, after the NBL is generated, the communication module sends a neighbor BS addition request message to the neighbor BSs of the NBL and receives a response message for the neighbor BS addition request message.

20. The apparatus of claim 11, wherein, after the NBL is generated, the communication module receives a neighbor BS addition request message, the controller determines whether to add a transmitter BS that transmitted the neighbor BS addition request message to the NBL, and whether to add the transmitter BS into the NBL is determined is based on at least one of a Time To Live (TTL) and the number of handoffs of the BSs in the NBL, a Received Signal Strength Indicator (RSSI) of the transmitter BS, a Carrier to Interference-and-Noise Ratio (CINR) of the transmitter BS, a distance to the transmitter BS, a standard distance to the transmitter BS, and a rank value.

21. The method of claim 1, wherein the determined information of the BS based on the collected information of neighbor BSs comprises at least one a frequency allocation, a preamble information or a transmit power allocated for the BS.

22. The apparatus of claim 11, wherein the determined information of the BS based on the collected information of neighbor BSs comprises at least one a frequency allocation, a preamble information or a transmit power allocated for the BS.

* * * * *